United States Patent
Jo et al.

(10) Patent No.: US 12,388,154 B2
(45) Date of Patent: Aug. 12, 2025

(54) SEPARATORS IMPROVED THERMAL RESISTANCE AND SECONDARY BATTERY COMPRISING SAME

(71) Applicant: SK INNOVATION CO., LTD., Seoul (KR)

(72) Inventors: Yun Kyung Jo, Daejeon (KR); Jae Woong Kim, Daejeon (KR); Jeong Han Kim, Daejeon (KR); Whee Sung Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 90 days.

(21) Appl. No.: 17/515,254

(22) Filed: Oct. 29, 2021

(65) Prior Publication Data

US 2022/0140436 A1 May 5, 2022

(30) Foreign Application Priority Data

Oct. 29, 2020 (KR) .................. 10-2020-0142262

(51) Int. Cl.
| | | |
|---|---|---|
| H01M 50/446 | (2021.01) | |
| H01M 4/62 | (2006.01) | |
| H01M 10/0525 | (2010.01) | |
| H01M 50/414 | (2021.01) | |
| H01M 50/417 | (2021.01) | |
| H01M 50/429 | (2021.01) | |
| H01M 50/451 | (2021.01) | |
| H01M 50/457 | (2021.01) | |
| H01M 50/489 | (2021.01) | |

(52) U.S. Cl.
CPC ......... *H01M 50/446* (2021.01); *H01M 4/623* (2013.01); *H01M 10/0525* (2013.01); *H01M 50/414* (2021.01); *H01M 50/417* (2021.01); *H01M 50/4295* (2021.01); *H01M 50/451* (2021.01); *H01M 50/457* (2021.01); *H01M 50/489* (2021.01)

(58) Field of Classification Search
None
See application file for complete search history.

(56) References Cited

U.S. PATENT DOCUMENTS

| | | | |
|---|---|---|---|
| 2015/0372277 A1 | 12/2015 | Honda | |
| 2017/0125763 A1* | 5/2017 | Inatomi | ..................... C08J 5/18 |
| 2019/0081306 A1 | 3/2019 | Lee et al. | |
| 2020/0020910 A1 | 1/2020 | Nam et al. | |
| 2020/0185676 A1* | 6/2020 | Lee | ..................... H01M 50/431 |
| 2021/0280947 A1* | 9/2021 | Wang | ................. H01M 50/451 |
| 2022/0021075 A1* | 1/2022 | Ishiguro | .................. B05D 7/24 |

FOREIGN PATENT DOCUMENTS

| | | |
|---|---|---|
| EP | 2634840 A1 | 9/2013 |
| KR | 20120070976 A | 7/2012 |
| KR | 10-2016-0051664 A | 5/2016 |
| KR | 20200007745 A | 1/2020 |
| WO | 2015026182 A1 | 2/2015 |
| WO | 2015146733 A1 | 10/2015 |

OTHER PUBLICATIONS

A Basic Guide to Particle Characterization, Malvern Instruments Worldwide—White Paper, May 2, 2012, pp. 1-26.
Extended European Search Report for the European Patent Application No. 21205694.9 issued by the European Patent Office on Mar. 24, 2022.
Office Action for Chinese Patent Application No. 202111245779 issued by the Chinese Patent Office on Jun. 30, 2025.

* cited by examiner

*Primary Examiner* — Robert S Carrico
(74) *Attorney, Agent, or Firm* — IP & T GROUP LLP

(57) ABSTRACT

The present invention relates to a separator including a coating layer and a substrate, wherein phase-change peak temperatures measured by differential scanning calorimetry (DSC) at the time of a first temperature increase and at the time of a second temperature increase satisfy specific ranges, a method of producing the same, and an electrochemical device including the same. More particularly, the present invention relates to a separator that has improved thermal resistance and thus may improve battery safety and implement stable movement of lithium ions and a lithium secondary battery including the same.

6 Claims, No Drawings

SEPARATORS IMPROVED THERMAL RESISTANCE AND SECONDARY BATTERY COMPRISING SAME

CROSS-REFERENCE TO RELATED APPLICATIONS

This application claims priority under 35 U.S.C. § 119 to Korean Patent Application No. 10-2020-0142262, filed on Oct. 29, 2020 in the Korean Intellectual Property Office, the disclosure of which is incorporated herein by reference in its entirety.

TECHNICAL FIELD

The following disclosure relates to a separator that has improved thermal resistance and thus may improve battery safety and implement stable movement of lithium ions and a lithium secondary battery including the same.

BACKGROUND

A lithium secondary battery has been widely used in electrical, electronic, telecommunication, and computer industries because it has a high energy density, and applications of the lithium secondary battery have been expanded to a high-capacity secondary battery for a hybrid vehicle, an electric vehicle, or the like, in addition to a small lithium secondary battery for a portable electronic device. The secondary battery includes a positive electrode, a negative electrode, an electrolyte, a separator, and the like.

Meanwhile, it is required for the separator to ensure continuous permeation of ions while separating the positive electrode and the negative electrode. In addition, recently, in accordance with high-capacity and high-output of the battery, stability of the separator and safety of the battery have become more important. As a method of implementing safety of a battery having a high energy density, attempts such as coating an inorganic material or a high heat-resistant polymer resin on at least one surface of a polyolefin film typified by polyethylene have been made.

A technology for estimating characteristics of a battery through characteristics of a separator is required to develop a separator and apply the developed separator to a battery. As one of these technologies, the characteristics of the battery have been estimated by checking physical properties of the separator. An example of the most common physical property check method to check the thermal resistance of the coated separator may include a method of exposing the separator to a high temperature in a film state and then checking a change in size of the film in a machine direction (MD) and a transverse direction (TD).

This method is suitable for determining characteristics and the like of the coated separator compared to an uncoated polyolefin film, but it is difficult to check that a separator including a coating layer is actually related to the battery safety.

RELATED ART DOCUMENT

Patent Document

Korean Patent Laid-Open Publication No. 10-2016-0051664 (May 11, 2016)

SUMMARY

An embodiment of the present invention is directed to providing a separator having improved thermal resistance and a lithium secondary battery including the same.

Another embodiment of the present invention is directed to providing a lithium secondary battery excellent in safety.

Still another embodiment of the present invention is directed to providing a separator having excellent electrical properties, that is, electrical stability, by being produced as a separator having a large difference between phase-change peak temperatures measured by differential scanning calorimetry (DSC) at the time of a first temperature increase and at the time of a second temperature increase.

In one general aspect, a separator includes a porous substrate and a coating layer formed on one surface or both surfaces of the porous substrate and including a binder and inorganic particles, wherein the separator satisfies the following Equation 1, $$\Delta T = T_1 - T_2 \geq 10 (° C.) \quad \text{[Equation 1]}$$

wherein $T_1$ is a phase-change peak temperature (melting temperature (Tm)) of the separator measured at the time of a first temperature increase, and $T_2$ is a phase-change peak temperature (melting temperature (Tm)) of the separator measured at the time of a second temperature increase performed after cooling the separator subjected to the first temperature increase, the phase-change peak temperature being measured by differential scanning calorimetry (DSC).

$\Delta T$ of the separator may satisfy 10 to 30.

The inorganic particle may be one or two or more selected from aluminum hydroxide, magnesium hydroxide, calcium oxide, magnesium oxide, alumina, barium sulfate, boehmite, titanium oxide, silica, aluminum nitride, $SrTiO_3$, $SnO_2$, $CeO_2$, NiO, ZnO, $ZrO_2$, $Y_2O_3$, SiC, and clay.

The binder may be one or two or more selected from cellulose, polyacrylate, polybenzoate, polyvinylpyrrolidone, polyvinylidene fluoride-co-hexafluoropropylene, polyvinylidene fluoride-co-trichloroethylene, polyacrylonitrile, polystyrene, polymethyl methacrylate, polybutyl acrylate, polyvinylacetate, an ethylene-vinyl-acetate copolymer (ethylene-co-vinyl acetate), polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, polyimide wholly aromatic polyamide, polyimide, polyamideimide, polysulfone, polyethersulfone, and a mixture thereof.

A thickness of the coating layer may be 1 μm to 10 μm.

An average particle size of the inorganic particles may be 40 nm to 1,000 nm.

The inorganic particles and the binder may be included in amounts of 50 to 99.9 wt % and 0.1 to 50 wt %, respectively, with respect to a total weight of the coating layer.

The separator may have a thermal shrinkage rate of 7% or less when measured in a machine direction (MD) and a transverse direction (TD) after being maintained at 130° C. for 1 hour.

The separator may have a thermal shrinkage rate of 4% or less when measured in a machine direction (MD) and a transverse direction (TD) after being left at 130° C. for 1 hour.

The separator may have a Gurley permeability of 250 sec/100 cc or less when measured according to ASTM D726.

In another general aspect, a lithium secondary battery includes the separator.

Other features and aspects will be apparent from the following detailed description, the drawings, and the claims.

DETAILED DESCRIPTION OF EMBODIMENTS

Hereinafter, the present invention will be described in more detail. However, each of the following specific exemplary embodiments or exemplary embodiments is merely one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention pertains. The terms used in the description of the present invention are merely used to effectively describe a specific exemplary embodiment, but are not intended to limit the present invention.

In addition, unless the context clearly indicates otherwise, the singular forms used in the specification and appended claims are intended to include the plural forms.

In addition, unless explicitly described to the contrary, "comprising" any components will be understood to imply further inclusion of other components rather than the exclusion of any other components.

An object of the present invention is to provide a separator excellent in battery safety by improving thermal resistance of the separator and implementing stable movement of lithium ions.

The present inventors found that it is possible to provide a separator excellent in battery safety by adjusting, to 10° C. or higher, a temperature difference between a phase-change peak temperature of a separator including a coating layer measured at the time of first SCAN and a phase-change peak temperature of the separator measured at the time of second SCAN after cooling of the separator, the phase-change peak temperature being measured by differential scanning calorimetry (DSC), thereby completing the present invention.

A separator according to an exemplary embodiment of the present invention may include a porous substrate and a coating layer formed on one surface or both surfaces of the porous substrate and including a binder and inorganic particles. The separator may satisfy the following Equation 1, $$\Delta T = T_1 - T_2 \geq 10 \quad \text{[Equation 1]}$$

wherein $T_1$ is a phase-change peak temperature (melting temperature (Tm)) of the separator measured at the time of a first temperature increase, and $T_2$ is a phase-change peak temperature (melting temperature (Tm)) of the separator measured at the time of a second temperature increase performed after cooling the separator subjected to the first temperature increase, the phase-change peak temperature being measured by differential scanning calorimetry (DSC).

According to an exemplary embodiment of the present invention, in a case where a battery is produced using the separator satisfying Equation 1, thermal resistance of the separator is improved, such that it is possible to provide a high-safety battery capable of suppressing ignition or rupture caused by an abnormal phenomenon, such as a rapid temperature increase, occurring in the battery.

$\Delta T$ may be preferably 12 or more, more preferably 15 or more, and most preferably 15 to 30. Within the above range, the thermal resistance of the separator is improved, such that ignition and rupture of the battery may be suppressed and a capacity and an output of the battery may be improved, which is preferable.

In an exemplary embodiment of the present invention, a method capable of obtaining 10 or more of $\Delta T$ is not particularly limited, but $\Delta T$ of 10 or more may be obtained by various factors such as a porosity, thickness, and material of a substrate layer, stretching conditions of substrates, types of inorganic particles and binder of the coating layer, thicknesses of the coating layer and the substrate layer, and drying conditions of the coating layer.

According to an exemplary embodiment of the present invention, the separator satisfying Equation 1 may have a high-temperature shrinkage rate of 7% or less, specifically, 4% or less, and more specifically, 3% or less, when measured after being maintained in a hot air drying oven at 130° C. for minutes. The separator according to the exemplary embodiment of the present invention is not significantly shrunk even at a high temperature. Therefore, the separator may be easily used for production of a battery and may have excellent durability. In addition, safety of the battery may be maximized and a capacity and an output of the battery may be improved.

According to an exemplary embodiment of the present invention, the separator satisfying Equation 1 may have a Gurley permeability of 1,000 sec/100 cc, preferably 250 sec/100 cc or less, and more preferably 100 sec/100 cc, when measured according to ASTM D726. The separator according to an exemplary embodiment of the present invention has the effect of improving the performance and the output of the battery because the electrical resistance of the separator is further reduced due to the excellent permeability of the separator.

Hereinafter, an exemplary embodiment of the porous substrate and the coating layer for satisfying Equation 1 and the physical properties described above will be described in more detail.

[Porous Substrate]

In an exemplary embodiment of the present invention, the porous substrate is generally used in the art and may be a woven fabric, a non-woven fabric, or a porous film, but the present invention is not limited thereto.

A material of the porous substrate is not limited. As a specific example, polyolefins such as polyethylene and polypropylene, polyesters such as polyethylene terephthalate and polybutylene terephthalate, polyacetal, polyamide, polyimide, polycarbonate, polyether ether ketone, polyaryletherketone, polyetherimide, polyamideimide, polybenzimidazole, polyethersulfone, polyphenylene oxide, a cyclic olefin copolymer, polyphenylene sulfide, polyethylene naphthalate, a glass fiber, and polytetrafluoroethylene may be used, and the porous substrate may be formed of one or two or more resins selected from the group consisting of these materials.

More specifically, in the present invention, the porous substrate may be a polyolefin-based microporous substrate layer and may be regarded as a microporous stretched film formed of a material produced by stretching a polyolefin resin. However, the present invention is not limited thereto. The polyolefin-based microporous substrate layer has uniform micropores, such that a flow of ions may be smooth and an internal short circuit due to projections or impurities on an electrode surface may be suppressed. In addition, the polyolefin-based microporous substrate layer has mechanical strength such as penetration strength and durability, which are more excellent than those of a non-woven fabric substrate layer.

The polyolefin is preferably one or more polyolefin resins selected from the group consisting of polyethylene, polypropylene, and a copolymer thereof, but is not limited thereto. The polyolefin-based microporous substrate layer may be a microporous stretched film produced by stretching a single-layer or multi-layer polyolefin resin, and inorganic particles, organic particles, or a mixture thereof may be contained in the polyolefin resin.

A thickness of the porous substrate is not particularly limited, and may be, for example, 1 to 100 µm, preferably 5 to 80 µm, and more preferably 6 to 50 µm, but is not limited thereto.

A pore size (diameter) and a porosity of the porous substrate are not particularly limited, and the porosity and the pore size are preferably 10 to 95% and 0.01 to 10 µm, respectively.

A Gurley permeability of the porous substrate may be 50 to 350 sec/100 cc.

[Coating Layer]

The separator for a lithium secondary battery according to an exemplary embodiment of the present invention includes a coating layer.

The coating layer may be formed on one surface or both surfaces of the porous substrate and may be coated on the entire surface of one surface.

A thickness of the coating layer is not particularly limited, and may be, for example, 0.01 to 10 µm, preferably 0.5 to 10 µm, and more preferably 1 to 5 µm, but is not limited thereto.

A weight per unit area of the coating layer may be 2 to 100 g/m², but is not limited thereto.

A weight ratio of the inorganic particles to the binder in the coating layer may be 50:50 to 99.9:0.1, preferably 80:20 to 99.9:0.1, more preferably 90:10 to 99:1, and still more preferably 95:5 to 99:1.

The binder included in the coating layer is not particularly limited, and is preferably one or two or more polymer binders selected from cellulose, polyacrylate, polybenzoate, polyvinylpyrrolidone, polyvinylidene fluoride-co-hexafluoropropylene, polyvinylidene fluoride-co-trichloroethylene, polystyrene, polymethyl methacrylate, polybutyl acrylate, polyvinylacetate, an ethylene-vinyl-acetate copolymer (ethylene-co-vinyl acetate), polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, polyimide wholly aromatic polyamide, polyimide, polyamideimide, polysulfone, and polyethersulfone. Polyvinyl alcohol, polyvinyl acetate, an acrylic resin, an ester resin, or a copolymer resin of the above resins may be used without limitation. In addition, the binder may be a water-soluble resin or a fat-soluble resin, but the present invention is not limited thereto.

As a non-limiting example, the inorganic particle may be one or two or more selected from aluminum hydroxide, magnesium hydroxide, calcium oxide, magnesium oxide, alumina, barium sulfate, boehmite, titanium oxide, boron nitride, aluminum nitride, silica, $SrTiO_3$, $SnO_2$, $CeO_2$, NiO, ZnO, $ZrO_2$, $Y_2O_3$, SiC, and clay, but the present invention is not limited thereto.

A size of the inorganic particle is not particularly limited, and may be 10 nm to 10 µm, preferably 0.01 µm to 5.0 µm, and more preferably 0.04 µm to 1.0 µm, in order to impart smooth coating and excellent electrical properties, but the present invention is not limited thereto. When the content and size of the inorganic particle included in the entire composition are within the above ranges, a decrease in pore size and porosity due to a decrease in void space formed between the inorganic particles may be prevented, and the inorganic particles may be uniformly distributed, such that dispersibility or coatability may be improved and deintercalation of the particles may be prevented, which is preferable. However, the present invention is not limited thereto.

A shape of the polymer binder or the inorganic particle is not particularly limited, and may be any shape such as a granular shape, a spherical shape, a chain shape, a needle shape, a fibrous shape, a plate shape, or a scale shape, and specifically, may be a fibrous shape.

In an exemplary embodiment of the present invention, the coating layer may be formed by applying a slurry composition containing inorganic particles and a binder.

More specifically, the slurry composition contains, for example, inorganic particles and a binder, and still more specifically, the slurry composition may contain inorganic particles, a binder, and a solvent. In addition, a solid content may be 5 to 40 wt %, but is not limited thereto.

In an exemplary embodiment of the present invention, a solution used in the slurry composition for forming the coating layer is usually prepared as an aqueous solution, and a polar aprotic solvent such as acetone, tetrahydrofuran, dimethylformamide, or N-methyl-2-pyrrolidone or a polar protic solvent such as water or ethanol may be used, if necessary, but the present invention is not limited thereto.

In an exemplary embodiment of the present invention, the inorganic particle used in the coating layer is not particularly limited as long as it is electrochemically stable.

The composition is preferably obtained by adding inorganic particles to the binder solution and then pulverizing an aggregate through sufficient pulverization of the inorganic particles using a ball mill or the like.

In an exemplary embodiment of the present invention, a pH of the composition may be 5 or more, and more preferably 5.5 or more. Within the above range, the dispersibility of the inorganic particles may be further improved.

A method of coating the binder solution in which the inorganic particles are dispersed on the porous substrate is not particularly limited, and the binder solution may be coated on one surface or both surfaces of the porous substrate using various methods such as a roll coating method, a spin coating method, a dip coating method, a bar coating method, a die coating method, a slit coating method, and an ink jet printing method without limitation.

An exemplary embodiment of the present invention provides a separator produced using the porous substrate including the coating layer as described above.

In addition, the separator produced in the present invention may be applied to an electrochemical device, and an example of the electrochemical device may include a lithium secondary battery.

Since the electrochemical device is well known and a configuration thereof is also known, the electrochemical device is not described in detail in the present invention.

Hereinafter, the present invention will be described in more detail with reference to Examples and Comparative Examples. However, the following Examples and Comparative Examples are only examples for describing the present invention in more detail, and the present invention is not limited by the following Examples and Comparative Examples.

Physical properties in the following Examples and Comparative Examples of the present invention were measured by the following methods.

[DSC Measurement Method]

Temperature scan was performed up to 200° C. at a temperature increase rate of 10° C./min under a nitrogen atmosphere using DSC (DSC6220, SII NanoTechnology Inc.) to measure a phase-change peak temperature ($T_1$) of a separator at the time of a first temperature increase. Thereafter, the separator was left for 5 minutes, the temperature was decreased up to −50° C. at a temperature decrease rate of 10° C./min, the separator was left for 5 minutes, and then, a phase-change peak temperature ($T_2$) of the separator at the time of a second temperature increase was measured. The amount of sample of the separator at that time was set to 5 mg.

[Evaluation of Thermal Shrinkage Rate]

A 10 cm×10 cm separator (sample) was used, five sheets of A4 paper were placed on each of top and bottom of the sample so that the sample was placed in the middle, and four sides of the paper were fixed with clips. The sample wrapped with the paper was left in a hot air drying oven at 130° C. for 1 hour. After leaving of the sample, the sample was taken out and an area of the separator was measured to calculate a shrinkage rate of the following Equation 1.

Shrinkage rate (%)=(area before heating−area after heating)×100/area before heating [Equation 1]

[Gurley Permeability]

A Gurley permeability was measured using a densometer manufactured by Toyo Seiki Seisaku-sho, Ltd. according to ASTM D726. The times taken for 100 cc of air to pass through an area of 1 square inch of the separator were recorded in seconds and compared with each other.

[Battery Lifespan Characteristics]

Each of batteries produced through an assembling process was charged and discharged at a charge and discharge rate of 1 C, and the number of times of cycles until the capacity was confirmed to be 70% of the initial capacity was checked. The temperature was 45° C.

[Penetration Test]

Each of the batteries produced through the assembling process was charged to 80% under a voltage of 4.2 V, and penetration was performed at the center of the battery at a speed of 80 m/sec using a nail having a diameter of 3 mm, and it was observed whether the battery was ignited. The battery was determined as "normal" when ignition was not observed or slight heating was generated and was determined as "ignition" when smoke, ignition, or the like was observed.

[Heat Exposure Test]

Each of the batteries produced through the assembling process was charged to 80% under a voltage of 4.2 V, and the charged battery was left in a hot air drying oven at 140° C. for minutes, and it was observed whether the battery was ignited. The battery was determined as "normal" when ignition was not observed or slight heating was generated and was determined as "ignition" when smoke, ignition, or the like was observed.

EXAMPLE 1

[Separator]

A thickness of a polyethylene substrate of a commercial separator (porosity: 47%, manufactured by Sumitomo) including a coating layer including alumina particles having an average particle size of 30 nm and a para-oriented aromatic polyamide binder was 10 μm, and a thickness of the coating layer was 3.0 μm. A difference between phase-change peak temperatures of the separator measured by DSC at the time of a first temperature increase and at the time of a second temperature increase was 11° C. The physical properties of the separator were evaluated. The results thereof are shown in Table 1.

[Production of Battery]

95 wt % of artificial graphite as a negative electrode active material, 3 wt % of acrylic latex (solid content: 20 wt %) having a Tg of −52° C. as a fusing agent, and 2 wt % of carboxymethyl cellulose (CMC) as a thickener were added to water and stirring was performed to prepare a uniform negative electrode slurry. The slurry was coated, dried, and compressed on a copper foil having a thickness of 20 μm to produce a negative electrode plate having a thickness of 150 μm.

94 wt % of $LiCoO_2$ as a positive electrode active material, 2.5 wt % of polyvinylidene fluoride as a fusing agent, and 3.5 wt % of carbon black as a conductive agent were added to N-methyl-2-prrolidone (NMP), which was a solvent, and stirring was performed to prepare a uniform positive electrode slurry. The slurry was coated, dried, and compressed on an aluminum foil having a thickness of 30 μm to produce a positive electrode plate having a thickness of 150 μm.

The separator was arranged between the positive electrode and the negative electrode to produce a pouch-type battery. An electrolyte in which 1 M lithium hexafluorophosphate ($LiPF_6$) was dissolved and ethylene carbonate (EC), ethyl methyl carbonate (EMC), and dimethyl carbonate (DMC) were added in a volume ratio of 25:45:20 was injected into the assembled battery. In order to seal the opening of the aluminum packaging material, heat sealing at 165° C. was performed to close the aluminum exterior package, thereby producing a 650 mAh pouch-type lithium secondary battery. The obtained lithium secondary battery was evaluated by the methods described above. The results thereof are shown in Table 2.

EXAMPLE 2

A thickness of a polyethylene substrate of a commercial separator (porosity: 47%, SE809I, manufactured by Senior Technology Material Co., Ltd.) having both surfaces on which a coating layer including alumina particles having an average particle size of 40 nm and a nanofiber-type cellulose (average particle size: 50 nm, average length: 300 nm) binder was formed was 9 μm, and a thickness of the coating layer was 0.9 μm. A difference between phase-change peak temperatures of the separator measured by DSC at the time of a first temperature increase and at the time of a second temperature increase was 15.62° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

EXAMPLE 3

A thickness of a polyethylene substrate of a commercial separator (porosity: 47%, KA09D, manufactured by Asahi Kasei Corporation) having both surfaces on which a coating layer including boehmite particles having an average particle size of 500 nm and a polyacrylate binder was formed was 9 μm, and a thickness of the coating layer was 1.5 μm. A difference between phase-change peak temperatures of the separator measured by DSC at the time of a first temperature increase and at the time of a second temperature increase was 14.4° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

EXAMPLE 4

A thickness of a polyethylene substrate of a commercial separator (porosity: 47%, manufactured by Senior Technology Material Co., Ltd.) including a coating layer including boehmite particles having an average particle size of 500 nm and a polyacrylate binder was 9 μm, and a thickness of the coating layer was 2 μm. A difference between phase-change peak temperatures of the separator measured by DSC at the time of a first temperature increase and at the time of a second temperature increase was 12.2° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

COMPARATIVE EXAMPLE 1

A thickness of a polyethylene substrate of a commercial separator (manufactured by Senior Technology Material Co., Ltd.) having both surfaces on which a coating layer including boehmite particles having an average particle size of 500 nm and a polyacrylate binder was formed was 9 μm, and a thickness of the coating layer was 2 μm. A difference between phase-change peak temperatures of the separator measured by DSC at the time of a first temperature increase and at the time of a second temperature increase was 7.4° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

COMPARATIVE EXAMPLE 2

A thickness of a polyethylene substrate of a commercial separator (manufactured by Senior Technology Material Co., Ltd.) having both surfaces on which a coating layer including titanium oxide particles having an average particle size of 40 nm and a nanofiber-type cellulose (average particle size: 50 nm, average length: 300 nm) binder was formed was 11 μm, and a thickness of the coating layer was 0.5 μm. A difference between phase-change peak temperatures of the separator measured by DSC at the time of a first temperature increase and at the time of a second temperature increase was 5.63° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

COMPARATIVE EXAMPLE 3

A thickness of a polyethylene substrate of a commercial separator (porosity: 47%, KD09D, manufactured by Asahi Kasei Corporation) having both surfaces on which a coating layer including boehmite particles having an average particle size of 500 nm and a polyacrylate binder was formed was 9 μm, and a thickness of the coating layer was 2 μm. A difference between phase-change peak temperatures of the separator measured by DSC at the time of a first temperature increase and at the time of a second temperature increase was 6.67° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

COMPARATIVE EXAMPLE 4

A thickness of a polyethylene substrate of a separator in which a coating layer was not included (porosity: 40%, HSP9, manufactured by Senior Technology Material Co., Ltd.) was 9 μm. A difference between phase-change peak temperatures of the separator measured by DSC at the time of a first temperature increase and at the time of a second temperature increase was 7.74° C. The physical properties of the separator were evaluated. The results thereof are shown in Table 1.

A lithium secondary battery was produced using the separator in the same manner as that of Example 1. The obtained lithium secondary battery was evaluated by the methods described above. The results thereof are shown in Table 2.

TABLE 1

| | Physical properties of separator | | | DSC | |
|---|---|---|---|---|---|
| | Thermal shrinkage rate (%) | Permeability (sec/100 cc) | $\Delta T$ $(T_1 - T_2)$ | Phase-change peak temperature at the time of first temperature increase $(T_1)$ (° C.) | Phase-change peak temperature at the time of second temperature increase $(T_2)$ (° C.) |
| Example 1 | 4 | 171 | 11 | 145 | 134 |
| Example 2 | 1 | 206 | 15.62 | 152.39 | 136.77 |
| Example 3 | 2 | 107 | 14.4 | 149.89 | 135.49 |
| Example 4 | 1 | 126 | 12.2 | 147.56 | 135.34 |
| Comparative Example 1 | 4 | 136 | 7.4 | 143.57 | 136.18 |
| Comparative Example 2 | 6 | 182 | 5.63 | 145.14 | 139.51 |
| Comparative Example 3 | 3 | 107 | 6.67 | 142.87 | 136.2 |

TABLE 1-continued

| | Physical properties of separator | | | DSC | |
|---|---|---|---|---|---|
| | | | | Phase-change peak temperature at the | Phase-change peak temperature at the |
| | Thermal shrinkage rate (%) | Permeability (sec/100 cc) | ΔT ($T_1 - T_2$) | time of first temperature increase ($T_1$) (° C.) | time of second temperature increase ($T_2$) (° C.) |
| Comparative Example 4 | 60 | 81 | 7.74 | 142.44 | 134.7 |

TABLE 2

| | Battery evaluation results | | |
|---|---|---|---|
| | Battery lifespan test | Nail penetration test | Heat exposure test |
| Example 1 | 1,300 | Normal | Normal |
| Example 2 | 1,200 | Normal | Normal |
| Example 3 | 1,300 | Normal | Normal |
| Example 4 | 1,200 | Normal | Normal |
| Comparative Example 1 | 1,300 | Ignition | Ignition |
| Comparative Example 2 | 1,300 | Ignition | Normal |
| Comparative Example 3 | 1,300 | Ignition | Normal |
| Comparative Example 4 | 700 | Ignition | Ignition |

The following was determined from Examples 1 to 4 and Comparative Examples 1 to 4 in Tables 1 and 2. In the results of the DSC measurement in Comparative Example 4 in which the coating layer was not included, it was confirmed that the difference between the phase-change peak temperatures at the time of the first temperature increase and at the time of the second temperature increase was 7.7° C., and all the safety and lifespan of the battery when the separator was applied to the battery were not suitable. However, in Example in which a predetermined coating was applied to the same substrate, the difference between the phase-change peak temperatures measured by DSC at the time of the first temperature increase and at the time of the second temperature increase was increased to 12.2° C., and as a result, all the lifespan and the safety of the battery were satisfied.

Accordingly, it was confirmed in the present invention that the coating layer contributed to the difference between the phase-change peak temperatures measured by DSC at the time of the first temperature increase and at the time of the second temperature increase.

In addition, the present inventors have confirmed that the battery safeties such as penetration and heat exposure were more excellent as the difference between the phase-change peak temperatures of the separator including the thermal-resistant coating layer measured by DSC at the time of the first temperature increase and at the time of the second temperature increase was large. Moreover, the present inventors have confirmed that when the difference between the phase-change peak temperatures at the time of the first temperature increase and at the time of the second temperature increase was 10° C. or higher, the battery safety was preferably more excellent.

As a result, it was confirmed in the present invention that the battery safety performance of the separator was easily estimated as the difference between the phase-change peak temperatures of the separator measured by DSC at the time of the first temperature increase and at the time of the second temperature increase was large, and the separator according to the present invention had excellent thermal resistance so that the separator was not shrunk or deformed even at a high temperature, such that ignition or rupture caused by an abnormal phenomenon, such as a rapid temperature increase, occurring in the battery was suppressed.

As set forth above, according to an exemplary embodiment of the present invention, the separator that has improved thermal resistance and thus may implement stable movement of lithium ions and the lithium secondary battery including the same may be provided.

The separator according to an exemplary embodiment of the present invention may have excellent thermal resistance so that the separator is not shrunk or deformed even at a high temperature and thus may suppress ignition or rupture caused by an abnormal phenomenon, such as a rapid temperature increase, occurring in the battery. As a result, a separator for a lithium secondary battery excellent in safety may be provided.

The present inventors found that a separator excellent in battery safety may be provided by providing the separator according to an exemplary embodiment of the present invention in which the difference between the phase-change peak temperature measured at the time of the first temperature increase (first SCAN) and the phase-change peak temperature measured at the time of the second temperature increase (second SCAN) after cooling of the separator is within a specific range, the phase-change peak temperature being measured by differential scanning calorimetry (DSC), for example, by adjusting the temperature difference to 10° C. or higher, thereby completing the present invention. That is, a novel separator having significantly excellent electrical properties may be provided by producing a separator having the above properties.

The method of imparting a specific difference between the phase-change peak temperatures measured by DSC at the time of the first temperature increase and at the time of the second temperature increase to the separator of the present invention is not particularly limited, and the temperature difference may be variously adjusted depending on the types of binder and inorganic particles constituting the coating layer, the mixing ratio of the binder and the inorganic particles, the thickness of the coating layer, the stretching direction of the substrate, and the like.

Hereinabove, although the present invention has been described by specific matters and limited exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A separator comprising:
 a porous substrate; and
 a coating layer formed on both surfaces of the porous substrate and consisting of a binder and inorganic particles,
 wherein a thickness of the coating layer is 1.8 µm to 3 µm,
 wherein the binder is nanofiber cellulose,
 wherein the inorganic particle is boehmite,
 wherein the separator has a Gurley permeability of 206 sec/100 cc or less when measured according to ASTM D726,
 wherein the separator satisfies the following Equation 1, $$12 \leq \Delta T = T_1 - T_2 \leq 30 \quad \text{[Equation 1]}$$

wherein $T_1$ is a phase-change peak temperature (melting temperature ($T_m$)) of the separator measured at the time of a first temperature increase, and $T_2$ is a phase-change peak temperature (melting temperature ($T_m$)) of the separator measured at the time of a second temperature increase performed after cooling the separator subjected to the first temperature increase, the phase-change peak temperature being measured by differential scanning calorimetry (DSC).

2. The separator of claim 1, wherein an average particle size of the inorganic particles is 40 nm to 1,000 nm.

3. The separator of claim 1, wherein the inorganic particles and the binder are included in amounts of 50 to 99.9 wt % and 0.1 to 50 wt %, respectively, with respect to a total weight of the coating layer.

4. The separator of claim 1, wherein the separator has a thermal shrinkage rate of 7% or less when measured in a machine direction (MD) and a transverse direction (TD) after being maintained at 130° C. for 1 hour.

5. The separator of claim 1, wherein the separator has a thermal shrinkage rate of 4% or less when measured in a machine direction (MD) and a transverse direction (TD) after being left at 130° C. for 1 hour.

6. A lithium secondary battery comprising the separator of claim 1.

* * * * *